(12) United States Patent
Wenzel et al.

(10) Patent No.: US 8,690,037 B2
(45) Date of Patent: Apr. 8, 2014

(54) SETTING DEVICE HAVING A MAGAZINE AND A PROVISIONING MODULE FOR JOINING ELEMENTS

(75) Inventors: Andreas Wenzel, Waltrop (DE); Mathias Krause, Spenge (DE); Bernd Haesler, Halle/Westfahlen (DE); Iris Spiller-Bohnenkamp, Bielefeld (DE); Torsten Draht, Schloss Holte (DE)

(73) Assignee: Böllhoff Verbindungstechnik GmbH (DE)

( * ) Notice: Subject to any disclaimer, the term of this patent is extended or adjusted under 35 U.S.C. 154(b) by 222 days.

(21) Appl. No.: 13/123,867

(22) PCT Filed: Oct. 12, 2009

(86) PCT No.: PCT/EP2009/007324
§ 371 (c)(1),
(2), (4) Date: Aug. 19, 2011

(87) PCT Pub. No.: WO2010/043362
PCT Pub. Date: Apr. 22, 2010

(65) Prior Publication Data
US 2011/0290848 A1    Dec. 1, 2011

(30) Foreign Application Priority Data
Oct. 13, 2008 (DE) .......................... 10 2008 051 489

(51) Int. Cl.
*B25C 3/00* (2006.01)
(52) U.S. Cl.
USPC .......................................... 227/120; 227/116
(58) Field of Classification Search
USPC ............ 227/120, 116, 149, 136; 221/10, 117, 221/236; 29/759, 760
See application file for complete search history.

(56) References Cited

U.S. PATENT DOCUMENTS

| | | | |
|---|---|---|---|
| 1,125,411 A | 1/1915 | Szemerey | |
| 1,767,926 A | 6/1930 | Hoffman | |
| 2,186,841 A | 1/1940 | Eylander | |
| 2,662,626 A | 12/1953 | Graham | |
| 2,680,246 A * | 6/1954 | Rambo | 227/118 |
| 2,785,400 A * | 3/1957 | Campbell, Jr. et al. | 227/114 |
| 2,909,302 A | 10/1959 | Hamlin et al. | |

(Continued)

FOREIGN PATENT DOCUMENTS

| | | |
|---|---|---|
| CH | 328832 | 3/1958 |
| DE | 344559 | * 11/1921 |

(Continued)

*Primary Examiner* — Michelle Lopez
*Assistant Examiner* — Nathaniel Chukwurah
(74) *Attorney, Agent, or Firm* — Hiscock & Barclay, LLP

(57) ABSTRACT

The present invention relates to a magazine of a setting device for storing and feeding a plurality of joining elements, particularly of joining elements, such as setting fasteners, to a provisioning module for joining elements and a setting device in combination with the joining elements. The magazine has a base element within the setting device including a storage groove, in which the joining elements can be received in an aligned and jointly moveable manner and one end of the base element ends in a head piece of the setting device. The magazine further includes an advancing mechanism, by which the joining elements can be moved within the storage groove towards the head piece of the setting device, as well as a dispensing mechanism, by which the joining elements can be fed individually from the storage groove to the head piece of the setting device.

13 Claims, 14 Drawing Sheets

(56) References Cited

U.S. PATENT DOCUMENTS

| | | | |
|---|---|---|---|
| 3,616,083 A * | 10/1971 | Mohr | 156/513 |
| 3,736,198 A * | 5/1973 | Leistner | 156/65 |
| 4,503,993 A * | 3/1985 | Ginnow et al. | 221/10 |
| 6,944,944 B1 | 9/2005 | Craythorn et al. | |
| 6,986,450 B2 | 1/2006 | Matthews et al. | |
| 7,089,654 B2 | 8/2006 | Chiba et al. | |
| 7,131,564 B2 | 11/2006 | Matthews et al. | |
| 7,331,098 B2 | 2/2008 | Matthews et al. | |
| 7,487,583 B2 | 2/2009 | Craythorn et al. | |
| 7,849,579 B2 | 12/2010 | Craythorn et al. | |
| 7,896,212 B2 | 3/2011 | Uejima et al. | |
| 2007/0049067 A1 * | 3/2007 | Hain et al. | 439/74 |
| 2007/0108250 A1 | 5/2007 | Odoni et al. | |
| 2009/0266866 A1 | 10/2009 | Davies et al. | |
| 2010/0163595 A1 | 7/2010 | Draht | |

FOREIGN PATENT DOCUMENTS

| | | |
|---|---|---|
| DE | 3713524 C1 | 5/1988 |
| DE | 102006036981 a1 | 2/2008 |
| GB | 524687 | 8/1940 |
| GB | 1407190 | 9/1975 |
| GB | 2224997 A | 5/1990 |
| WO | WO00/07751 | 2/2000 |

* cited by examiner

SETTING DEVICE HAVING A MAGAZINE AND A PROVISIONING MODULE FOR JOINING ELEMENTS

CROSS REFERENCE TO RELATED APPLICATIONS

Pursuant to 35 USC §371, this application is a National Stage of International Application No. PCT/EP2009/007324, filed Oct. 12, 2009, which claims priority to German Patent Application No. 10 2008 051 489.6, filed Oct. 13, 2008 under applicable paragraphs of 35 USC §119, wherein the entire contents of each above-noted document is herein incorporated by reference.

FIELD OF THE INVENTION

The present invention relates to a magazine of a setting device for storing and feeding a plurality of joining elements, a provisioning module with which the plurality of joining elements can be fed to the magazine of the setting device, a setting device in combination with this magazine and this provisioning module, and a feeding method for joining elements to the setting device.

BACKGROUND OF THE INVENTION

Setting devices for joining elements, such as punch rivets or setting fasteners, for example, are known from the prior art. In order to guarantee a joining of joining elements in a specific unit of time, a plurality of joining elements is stored in a magazine. This magazine feeds the joining elements individually to the setting device so that a complex reload of the setting device is not required for each new joining element.

In the document, WO 00/07751, punch rivets are pre-stored in tubes having different cross sectional shapes. These tubes have, for example, a T-shaped cross section. Furthermore, several tubes are connected together so that these tubes form a pre-magazine for joining elements in the shape of a rolled up mat, for example. In addition, the transport of the joining elements to the setting device occurs using hoses and compressed air. There, they are fed, adjacent to each other, to a magazine in the shape of a further hose. Along with this hose, there is also a further hose that also serves as a magazine. In this manner, the joining elements from the first hose are joined, while the second hose is used for reloading further joining elements.

The document, U.S. Pat. No. 1,767,926, describes the fastening of nails to a tape that is coiled within a drum magazine. During the feeding of the nails, they are grasped individually and released from the tape. Because these nails are all connected together by means of the tape, the tape guarantees the advance of all nails located in the drum magazine.

The document, WO 2007/031701, describes a feeding system for punch rivets of a setting device driven by compressed air. It is comprised of a loading station, an intermediate magazine, and a feed hose for the setting device. The transport paths within this system have a T-shaped cross section so that the rivet head of the punch rivet it is supported on the shoulders of the cross-section, in order to be moved in this position. The punch rivets are blown into a rail having a T-shaped cross-section that forms an intermediate magazine. The punch rivets are then fed from this intermediate magazine to the setting device via a hose.

The document, DE 10 2008 018 428.4, describes a strip magazine and a rotary magazine similar to a revolver. Both types of magazines are moved stepwise so that after one step in each case a new joining element is located under the punch of the setting device. The strip magazine comprises a rigid strip having a fixed number of retaining positions for the joining elements. The rotary magazine comprises a fixed number of chambers, each having a joining element disposed therein. The individual retaining positions or chambers are moved into a feed position beneath the punch of the setting device so that during the joining procedure, the punch in each case moves through a retaining position.

In order to improve the feeding of joining elements to the setting device in comparison to the prior art, it is the object of the present invention to provide a high-performance magazine for a setting device, a provisioning module for filling the magazine with joining elements and a method for feeding joining elements to the magazine of the setting device.

SUMMARY OF THE INVENTION

The above object is achieved by a magazine, a provisioning module, and a feeding method according to the independent claims. Further advantageous designs and further developments of the present invention arise from the following description, the figures and the dependent claims.

The magazine of the setting device for storing and feeding a plurality of joining elements, particularly setting fasteners, has the following features: a basic element within the setting device having a storage groove, in which the joining elements can be received in an aligned and jointly movable manner and the one end of which ends in a head piece of the setting device, an advancing mechanism by which the joining elements can be moved within the storage groove towards the headpiece of the setting device, and a dispensing mechanism by which the joining elements can be fed individually from the storage groove to the headpiece of the setting device.

Using the magazine described above, a plurality of joining elements are stored within the setting device. The storage of the plurality of joining elements within the storage groove of the base element guarantees an operation of the setting device in a normal position, as well as in an overhead position, without joining elements being able to fall out. Furthermore, the advancing mechanism and dispensing mechanism act together so that the plurality of joining elements stored in the storage groove can be feed individually in an effective manner to the feed channel of the setting device. After the joining elements stored in the storage groove have been used by joining, the storage groove is refilled with new joining elements using the provisioning module described below.

According to one embodiment, the storage groove of the base element forms a spiral and runs from the outer edge of the base element to the center of the base element. In addition, the storage groove is shaped such that the joining elements are held therein by means of a form fit.

The spiral shape of the storage groove within the base element guarantees that a plurality of joining elements can be received within the storage groove. This multitude of joining elements prevents a continuous reloading of the setting device, so that specific joining tasks of the setting device can be performed without putting the device down and reloading. Furthermore, the spiral shape of the storage groove guarantees that the plurality of joining elements can be moved easily within the storage groove. The spiral shape specifically does not have corners or curves having a small curvature radius through which the joining elements could be moved only with increased drive expenditure or a costly drive technology. Furthermore, the frictional resistance during advance of the joining elements within the spiral is negligible so that a rapid advance of the joining elements toward the joining channel of the setting device is supported.

According to a further embodiment of the magazine, the advancing mechanism comprises the rotatable brush-like arrangement, with which the joining elements can be moved by means of a friction connection within the storage groove. According to a further embodiment, the advancing mechanism comprises a finger disposed so as to rotate that engages in the storage groove and by means of its rotational movement, the joining elements can be pushed in the rotational direction of the finger within the storage groove.

Using the proposed advancing mechanism, a feeding of the joining elements toward the joining channel is guaranteed with low constructive costs. With the use of the brush-like arrangement for advancing the joining elements by means of friction connection, nearly all of the joining elements within the storage groove are moved simultaneously in the direction of the joining channel of the setting device. According to a second alternative of the advancing mechanism using the finger, disposed so as to rotate, it engages at the last joining element within the storage groove and pushes the plurality of joining elements in the direction of the joining channel of the setting device. According to a further alternative of the advancing mechanism, multiple air jets are disposed within the storage groove so that the joining elements can be moved by means of air blown into the storage groove.

The dispensing mechanism of the magazine, according to one alternative, comprises a rotary slide which moves the joining elements individually out of the storage groove into the head piece of the setting device. According to a further alternative, two spring preloaded jaws are disposed at the inner end of the spiral shaped storage groove. These jaws are spring preloaded toward each other, so that they can be moved to close the head piece and with it the joining channel of the setting device, and release it on their own with pressure due to an arriving joining element. According to one embodiment, these jaws are used alone in combination with the storage groove and the advancing mechanism. According to another alternative, these spring preloaded jaws are used in combination with the rotary slide, mentioned above.

In addition, the magazine has preferably a connecting module at the outer edge of the base element to which a pre-magazine for joining elements can be fastened to the magazine, so that joining elements can be transferred from the pre-magazine into the storage groove.

Furthermore, the present invention discloses a provisioning module with which a plurality of joining elements can be provided for a magazine of the setting device and to which they can be fed. According to a first embodiment, the provisioning module has the following features: a conveying unit with which the joining elements can be aligned and can be fed to at least one pre-magazine, and a feed arrangement to which the conveying unit can be connected via a transport track, having at least one, preferably in each case, one pre-magazine, so that the joining elements being provided by the conveying unit can be fed targeted to each pre-magazine by means of gravity.

Furthermore, the present invention discloses also a provisioning module with which a plurality of joining elements can be provided for a magazine of the setting device and to which they can be fed. This preferred provisioning module has the following features: a conveying unit with which the joining elements can be aligned and can be fed to a plurality of pre-magazines, and a switchable switching arrangement to which the conveying unit can be connected having at least one, preferably in each case, one pre-magazine, so that the joining elements being provided by the conveying unit can be fed targeted to each pre-magazine by means of gravity.

The provisioning modules according to the invention guarantee that for a reloading of a magazine of a setting device only a limited expenditure of time is necessary because the joining elements to be reloaded are pre-magazined within the provisioning module. In this manner, the reloading of a plurality of joining elements in the form a packet is possible so that it is not necessary to start a reloading procedure for each individual joining element. Therefore, within the provisioning module, using the conveying unit, in each case a plurality of joining elements are distributed to only one or more individual pre-magazines. Within the pre-magazine, the joining elements are disposed in the correct position, so that a subsequent feeding to a magazine of the setting device does not require any reorientation of the joining elements. For the feeding of the joining elements to the pre-magazine, only a limited constructive expense is necessary because the joining elements are moved into the pre-magazines by means of gravity. This avoids expensive drive systems, such as by means of compressed air or a mechanical means, for example. If the plurality of the joining elements is fed only to one pre-magazine, a conveying unit can preferably be switched off, while the feed arrangement produces a continuous and/or interruptible connection between the conveying unit in the pre-magazine.

According to one embodiment, the conveying unit of the provisioning module comprises a vibration conveyor with which joining elements can be conveyed, from an unordered quantity, aligned to the switching arrangement. In addition, it is preferred to equip the switching arrangement with a track slider having at least one connecting track for joining elements, where the track slider is equipped so that at least one connecting track produces a connection between the conveying unit and the at least one pre-magazine. Through the targeted arranging of the connecting track by means of the track sliders, a selected connection between the vibration conveyor and the pre-magazine arises. On this basis, the first connected pre-magazine is filled with joining elements as quickly as possible. The joining elements glide, driven by gravity, into the pre-magazine until the capacity of the pre-magazine of joining elements is exhausted. Then, the track slider is moved so that using the connecting track a connection is produced between the vibration conveyor and a further pre-magazine. Now, the filling of a further pre-magazine starts anew. It is also preferred to use the track slider as a cut-off switch for the feeding of joining elements to the pre-magazine, in that the connecting track between the vibration conveyor and the pre-magazine is interrupted by sliding the track slider, as soon as it is necessary or requested to stop the feeding of joining elements. It is also preferred to equip the track slider with more than one connecting track so that simultaneously a connection can be produced between the vibration conveyor and several pre-magazines. These pre-magazines are then filled simultaneously until their storage capacity for joining elements is exhausted. The presence of multiple connecting tracks in the track slider also ensures that the connection between the vibration conveyor and each individual pre-magazine can be produced solely by the sliding the track slider.

In order to support the transport of joining elements within the switching arrangement, the switching arrangement is preferably connected to a vibration element.

According to a further embodiment of the provisioning module according to the invention, the pre-magazine comprises a storage rail, disposed inclined, in which the joining elements can be received and aligned using positive fit in a movable manner, and can be fed by means of the incline of the storage rail to its one end automatically, that is, by means of its own motion. In a further design, the pre-magazine comprises, at one end of the storage rail, a movable congestion block for retaining the joining elements, and a coupling unit with which the pre-magazine and the magazine of a setting device can be coupled.

According to a further design of the present provisioning module, the pre-magazine is equipped with a movable slider unit which is movable along the storage rail and engages therein so that the joining elements can be slid out of the pre-magazine. Preferably, the slider unit additionally comprises a first sensor with which a movement of the slider unit along the storage rail can be detected, and/or a second sensor with which a contact of the slider unit with a plurality of accumulated joining elements in the storage rail can be detected.

As soon as the magazine of a setting device is connected by means of the coupling unit of the pre-magazine and the connecting module of the magazine, the joining elements are guided out of the pre-magazine into the magazine of the setting device, not only by the gravitational force. The slider unit provides support here, in that the plurality of joining elements from the pre-magazine is pushed directly into the spiral-shaped storage groove of the magazine of the setting device. On this basis, it is possible to refill the setting device with very little time expended.

The present invention further comprises a setting device for placing joining elements with the magazine, described above, and/or the provisioning module, described above.

The present invention also discloses a method for feeding joining elements to a magazine of a setting device, which has the following steps: filling a pre-magazine of a provisioning module with a plurality of joining elements that are movable and arranged aligned, moving a setting device having a magazine toward the pre-magazine and coupling the magazine to the pre-magazine, and pushing the joining elements out of the pre-magazine into the magazine of the setting device using a sliding unit.

DETAILED DESCRIPTION OF THE DRAWINGS

Preferred embodiments of the present invention are explained in more detail in reference to the accompanying drawings, in which.

DETAILED DESCRIPTION

The present invention relates to a setting device S of a known type, that is used for joining elements, for instance punch rivets and setting fasteners. The setting device S is equipped with the magazine 1 according to the invention, in which a plurality of joining elements, particularly setting fasteners, can be stored. In order to fill the magazine 1 with joining elements in an efficient manner, it can be connected to a provisioning module B (see FIG. 1). The provisioning module B provides a plurality of aligned joining elements from an unordered quantity of joining elements into a pre-magazine 70. The pre-magazine 70 can be connected at a desired point in time, to the magazine 1 of the setting device S, so that joining elements can be refilled into the magazine 1. For this refilling of joining elements, a robot R moves the setting device S toward the provisioning module B so that it can be coupled there for filling the magazine 1, and holds it fixed in this position, until the filling is completed. If according to one preferred embodiment, only one pre-magazine 70 is used, a switching arrangement 60, described later, serves for switching on and off the feeding of joining elements to the pre-magazine 70. In this embodiment, it is also preferred to provide, instead of the track slide or the switching arrangement 60, an optional interruptible connection between a preferred vibration conveyor V (see below) and a pre-magazine 70. If, for instance, a sensor at the pre-magazine 70 (see below) signals that this is sufficiently filled with joining elements, a block interrupts the connecting track between the vibration conveyor V and the pre-magazine 70. It is further preferred that at the same sensor signal the vibration conveyor V interrupts the further conveyance of joining elements, until the pre-magazine 70 is again completely or partially unloaded.

Figure 4:
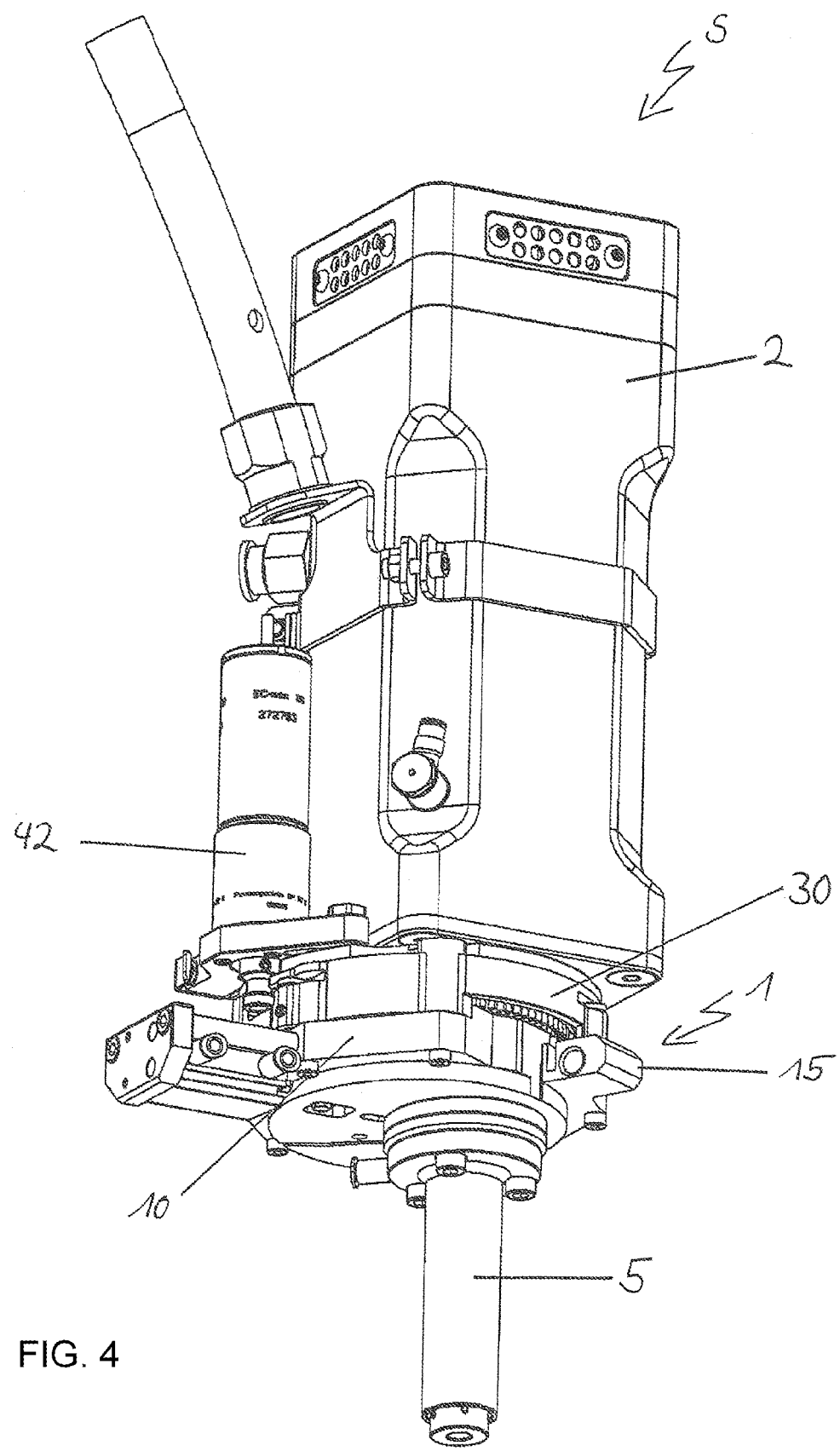
FIG. 4 is a simplified representation of a setting device.

The setting device S is represented by means on an example in FIG. 4. It comprises a drive 2, the magazine 1, a head piece 5 having a joining channel and a drive 7 for the magazine 1. The magazine 1 is disposed between the drive 2 and the head piece 5 of the setting device S, so that joining elements are fed directly out of the magazine 1 to the head piece 5, in order to join them there by means of the punch (not shown) of the setting device S. The magazine 1 comprises a base element 10 having a covering 30. A connection module 15, to which the provisioning module B can be coupled, is provided at the base element 10. The magazine 1 is shown in greater detail in FIGS. 5 and 6.

Figure 5:
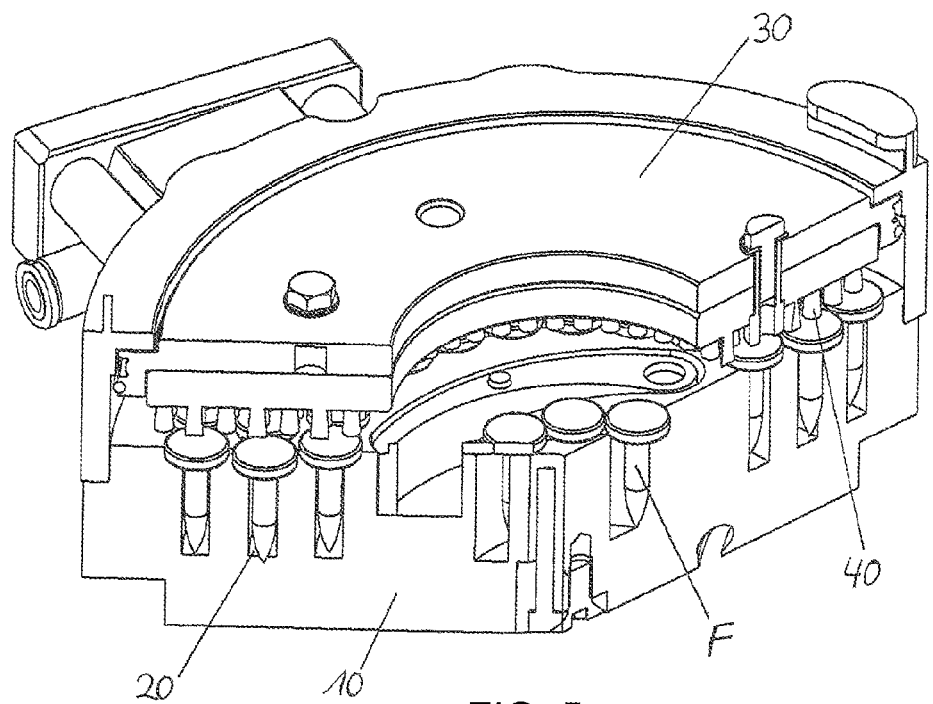
FIGS. 5 and 6 depict different embodiments of the magazine of the setting device.

FIG. 5 show a perspective sectional view of a first embodiment of the magazine 1. A spiral shaped storage groove 20 for receiving joining elements F is disposed within the base element 10. The spiral shaped storage groove 20 runs from the circumferential outer edge of the base element 10 inward toward the center of the base element 10, and opens there into the head piece 5 of the setting device S. The spiral shaped course of the storage groove 20 guarantees the receiving of a plurality of joining elements F, thus a high storage capacity of the magazine 1 of the setting device S. Furthermore, the spiral shaped storage groove S ensures that a nearly resistance-free movement of the joining elements F can occur in the direction of the head piece 5 within the spiral shaped storage groove. This is based on the fact that the spiral shaped storage groove 20 does not have any corners, kinks, or curves with a small curvature radius, in which joining elements F could remain stuck or strongly braked during their movement toward the head piece.

As an example, setting fasteners are shown as joining elements F in the sectional representation of the magazine 1 in FIG. 5. The size of the storage groove 20 is designed so that the head of a joining element F is supported above the storage groove 20. The shaft of the joining element F is received by the storage groove 20. In this manner, the joining elements F are held and guided using a form fit in the storage groove 20.

The cover 30 is disposed adjacent to the storage groove 20 so that the joining elements F themselves can not fall out of the storage groove 20 during an overhead operation of the setting device S. The cover 30 comprises an advancing mechanism with which the joining elements F can be moved within the storage groove 20 toward the head piece 5 of the setting device S. According to a first embodiment, the advancing mechanism is comprised of a motor driven brush-like arrangement 40, a disk brush, for example. The brush-like arrangement 40 is designed two-dimensional and produces a friction connection with each head of the joining elements F in the storage groove 20. In addition, the brush-like arrangement 40 is preferably spring preloaded in the direction of the joining elements F in order to guarantee the friction connection to the joining elements F, and to minimize wear of the brush-like arrangement 40.

Due to the rotation of the brush-like arrangement 40 using the drive 42, the joining elements F are moved within the storage groove 20 toward the inner end of the storage groove 20, that is, toward the head piece 5. The brush-like arrangement 40 preferably has a ring shape, which leaves open a region of the spiral groove 20 located near the head piece 5. Due to the rotation of the brush-like arrangement 40, the joining elements F are moved toward the head piece 5, and thus toward the joining channel of the setting device S. Furthermore, the rotation of the brush-like arrangement 40 optionally supports a filling of the magazine 1 with new joining elements F, as is described below in more detail.

The motor drive 42 of the advancing mechanism is preferably disposed at the outside of the setting device S, as is shown in FIG. 4. However, it is also conceivable to integrate the motor drive 42 into the magazine 1 of the setting device.

According to a further embodiment of the present invention (see FIG. 6), the advancing mechanism comprises a motor driven finger 44 disposed so as to rotate. The finger 44 engages in the storage groove 20 and slides the joining elements F in the direction of the head piece 5 of the setting device S (see FIG. 6). In this embodiment of the advancing mechanism also, the covering 30 prevents the joining elements F from falling out of the storage groove 20 in the case of an overhead operation of the setting device S.

According to a further embodiment of the advancing mechanism, it comprises a plurality of air jets, which are disposed within the storage groove 20. Air is blown into the storage groove 20 by means of theses air jets, directed so that the joining elements F stored in the storage groove 20 can be moved in the direction of the head piece 5. In this arrangement too, the cover 30 again ensures that the joining elements F stored in the storage groove 20 cannot fall out of the storage groove 20 during an overhead operation of the setting device S.

Figure 7:
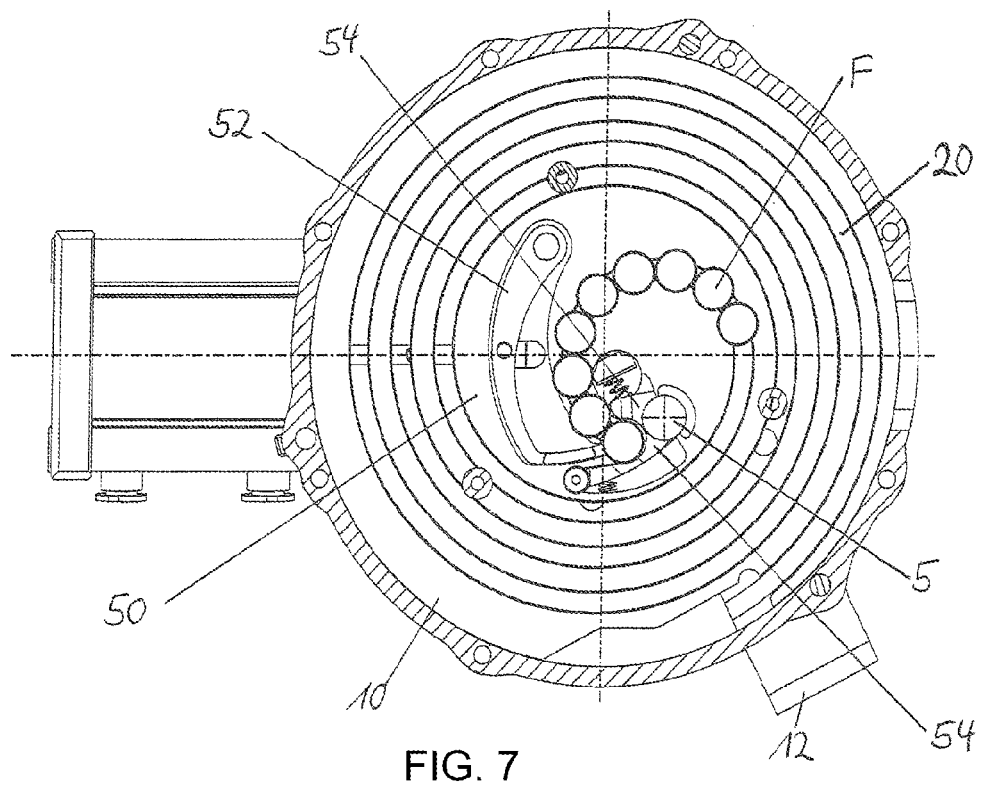
FIG. 7 is a sectional representation of an embodiment of the magazine of the setting device.

A dispensing mechanism 50 is disposed adjacent to the inner end of the storage groove 20. Two preferred embodiments of this dispensing mechanism 50 are represented in the FIGS. 6 to 7. According to the embodiment represented in FIG. 7, the dispensing mechanism 50 is comprised of a rotary slide 52 and two spring preloaded jaws 54. The rotary slide 52 is preferably driven pneumatically, while other types of drives can also be used, for example, electrical. The rotary slide 52 is fastened so as to rotate at its end facing away from the joining elements F, and rotates or pivots about this fastening as soon as it is driven. This rotary or pivot movement moves the end of the rotary slide 50 facing the joining elements F in the direction of the head piece 5, in which the joining channel of the setting device S runs.

The two spring preloaded jaws 54 block the entrance to the head piece 5, and in particular, to the joining channel or setting channel of the head piece. If the rotary slide 52 is driven, the rotary slide 56 presses a joining element F against the jaws 54. Due to this pressure via the joining element F, the jaws 54 are moved away from each other against the spring preloading so that the joining channel is exposed, and the joining element F moves into the joining channel of the setting device S. As soon as the feeding is complete, that is, the joining element F has arrived in the joining channel or the head piece 5, the rotary slide 52 moves back and the jaws 54 again close the access to the head piece. In addition, the start trigger occurs, and the punch of the setting device S moves through the magazine 1 into the joining channel and joins the joining element F to the joining location (not shown).

Figure 6:
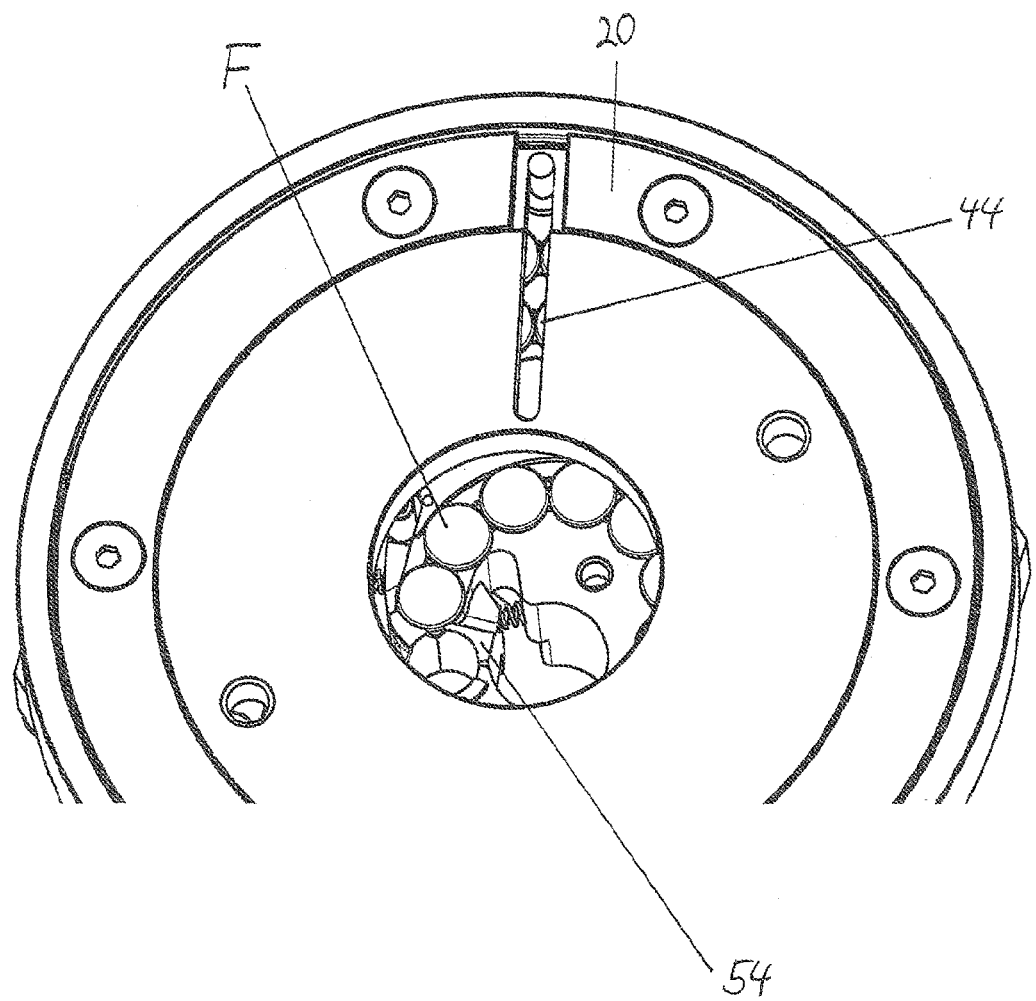

According to the embodiment of the dispensing mechanism 50 shown in FIG. 6, the feeding of the joining elements F occurs without the rotary slide 52. The joining elements F located in the storage groove 20 are moved by the advancing mechanism in the direction of the joining channel and the head piece 5. At the inner end of the storage groove 20, the spring preloaded jaws 54 deliver the arriving joining elements F individually to the joining channel, because the thrust of the dispensing mechanism 50 overcomes the spring preloading of the jaws 54. After delivery, the jaws 54 close and again close the joining channel. Then, the setting of the joining element F occurs using the punch, as was already described.

Figure 1:
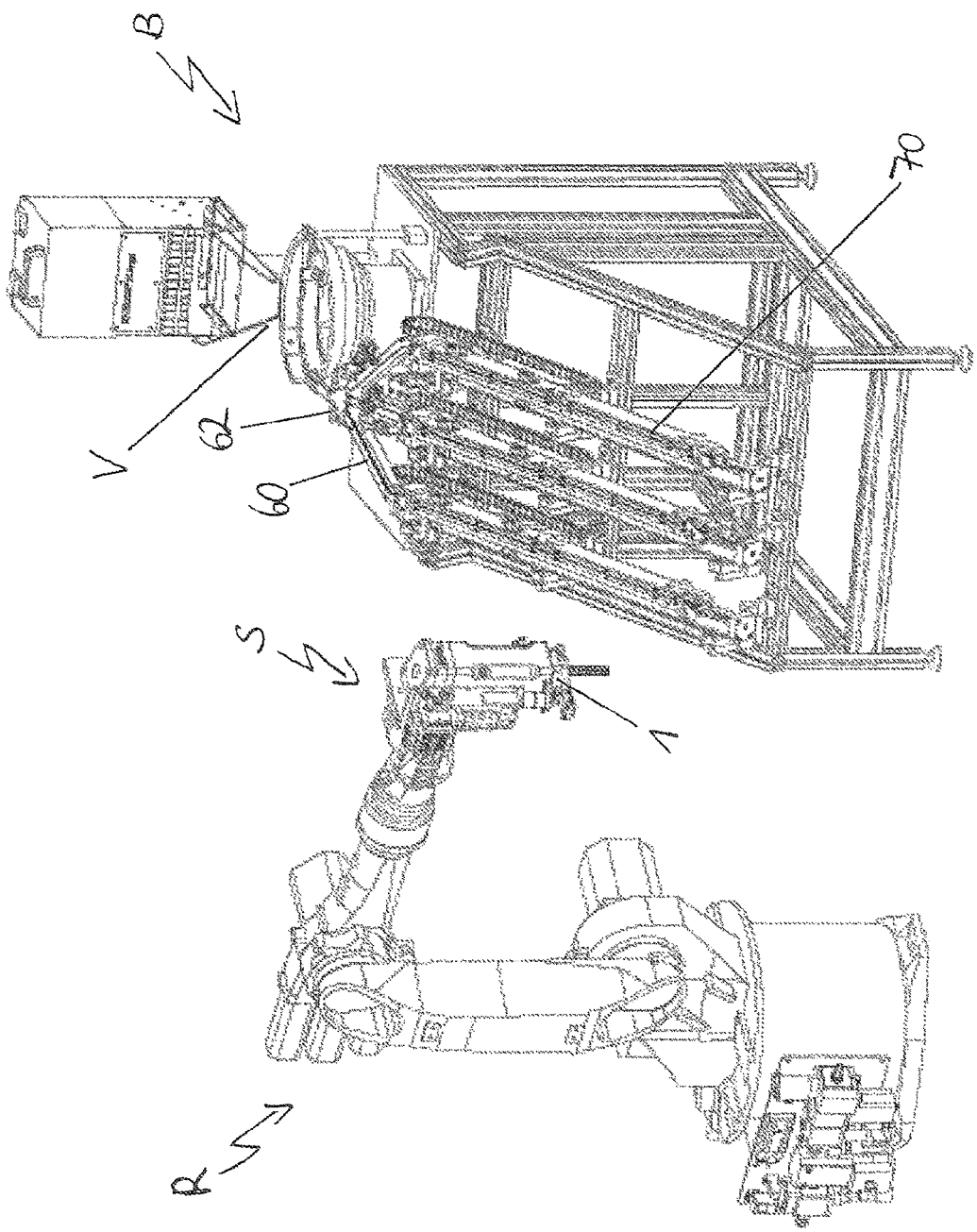
FIG. 1 depicts a setting device, having a magazine and an associated provisioning module fastened to a robot.

FIG. 1 shows a preferred embodiment of the provisioning module B in combination with a setting device S fastened to a robot R. The provisioning module B is fastened to a frame so that it can be positioned arbitrarily, but reachable by the robot R and the setting device S. Along with this type of arrangement, other possibilities are conceivable, such as a fixed installation of the provisioning module B, for example.

The provisioning module B comprises a vibration conveyor V that conveys and provides joining elements F from an unordered quantity aligned and in the correct position. In order to guarantee the replenishment of joining elements F, the vibration conveyor V is preferably combined with a hopper or storage module for joining elements.

Figure 2:
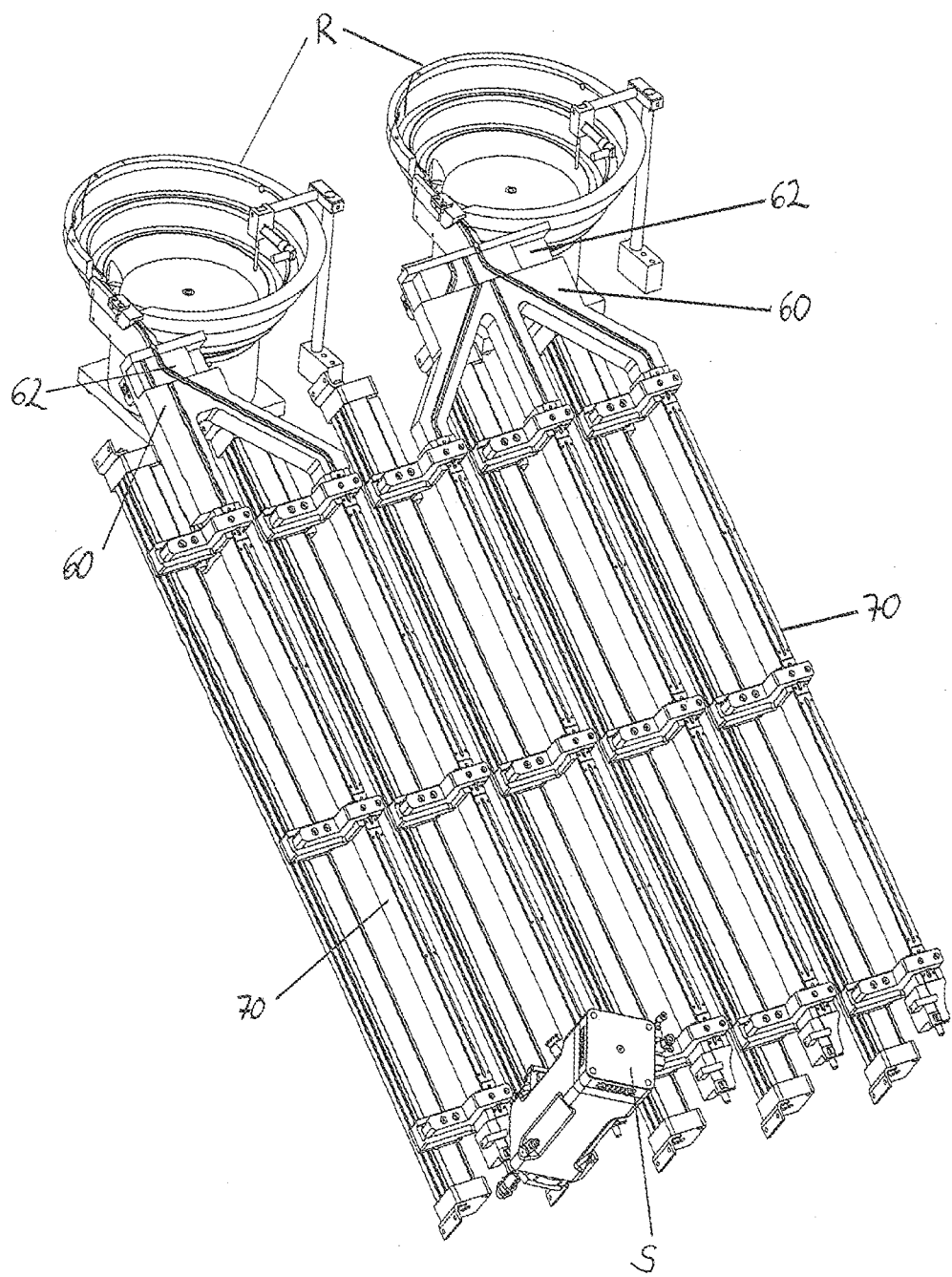
FIGS. 2 and 3 depict preferred embodiments of the provisioning module.
Figure 3:
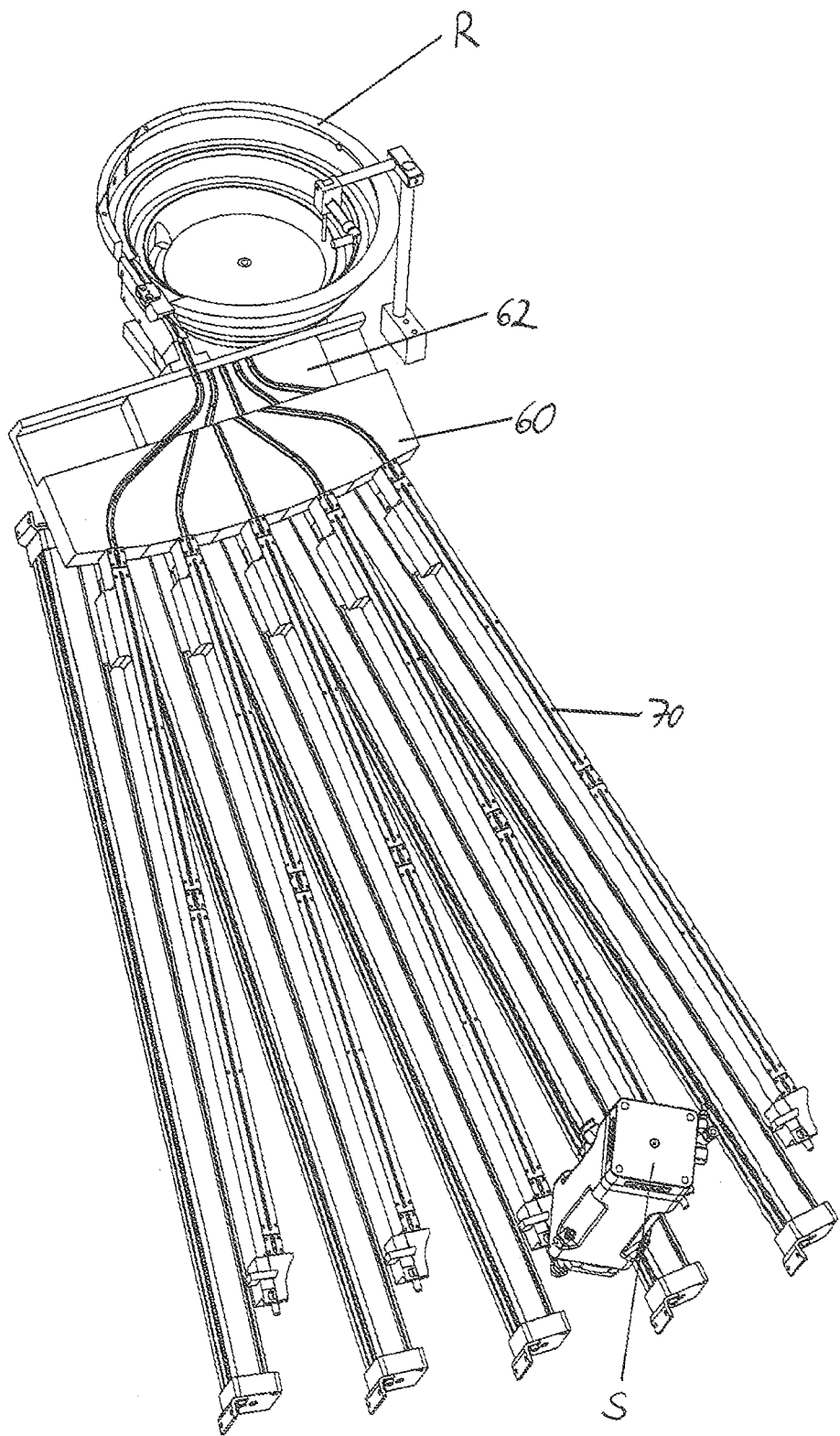

Furthermore, the provisioning module B comprises a switching arrangement 60, which comprises a movable track slide 62. The switching arrangement 60 provides two, three or more, connections between the vibration conveyor V and a corresponding number of pre-magazines 70. An example of this is represented in the FIGS. 1 to 3. In addition, it is preferred to use the previously described configuration of the provisioning module B, in which only one pre-magazine 70 is connected to the vibration conveyor V (see above). In this embodiment, the track slide 62 comprises only one connection path between the one pre-magazine 70 and the vibration conveyor V. In addition, instead of a movable slide, it is equipped with a movable block which can interrupt the connection path in a targeted and controlled manner.

Figure 8:
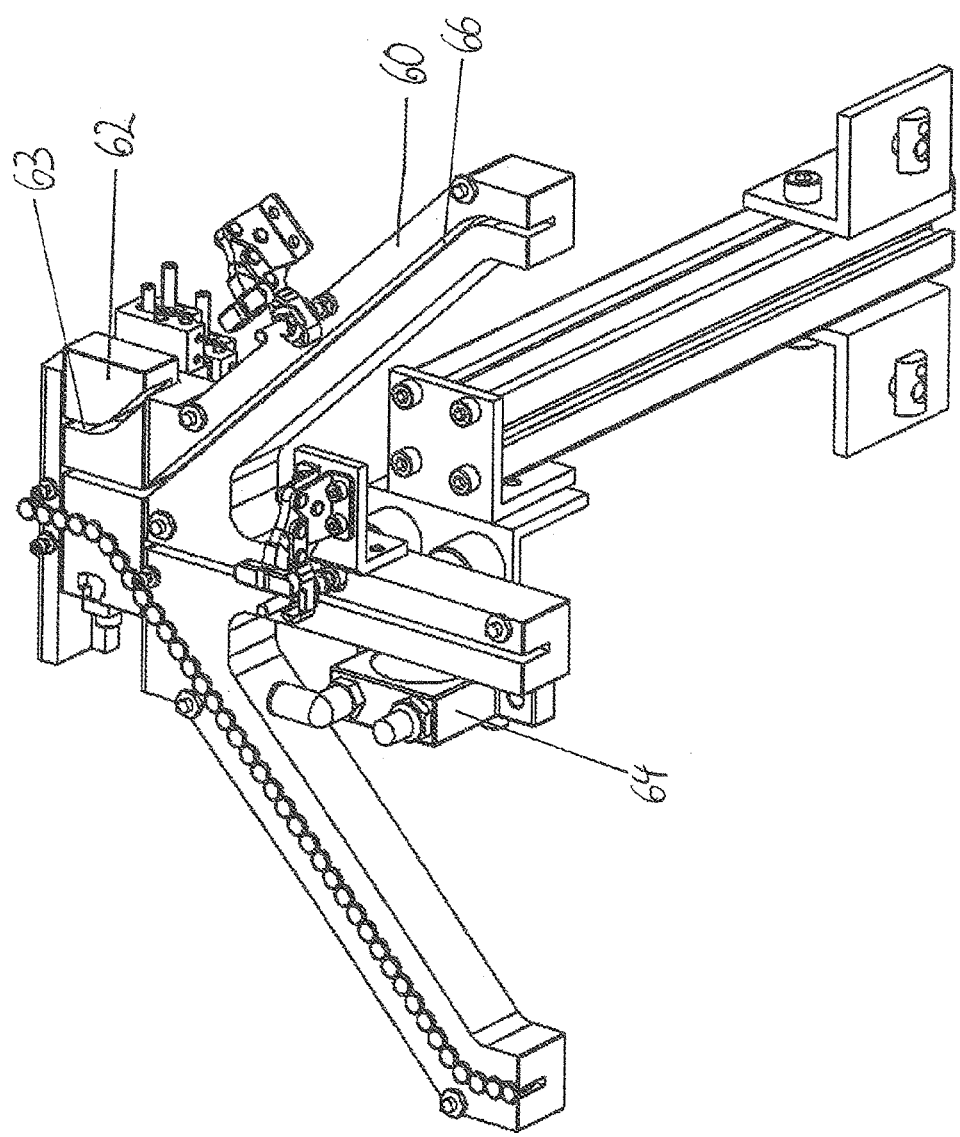
FIG. 8 is an embodiment of the switching arrangement of the provisioning module.
Figure 9:
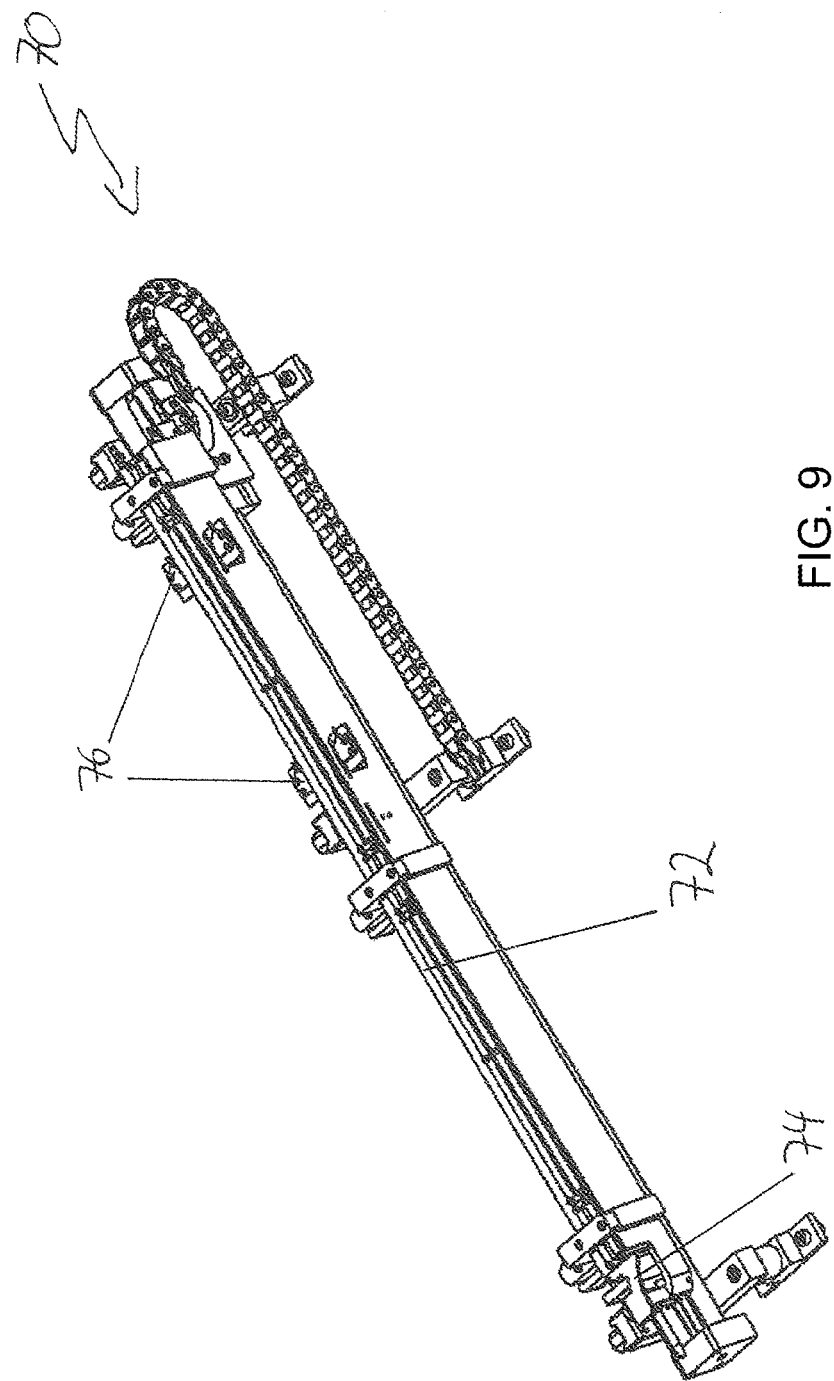
FIG. 9 is an embodiment of the pre-magazine of the provisioning module.
Figure 10:
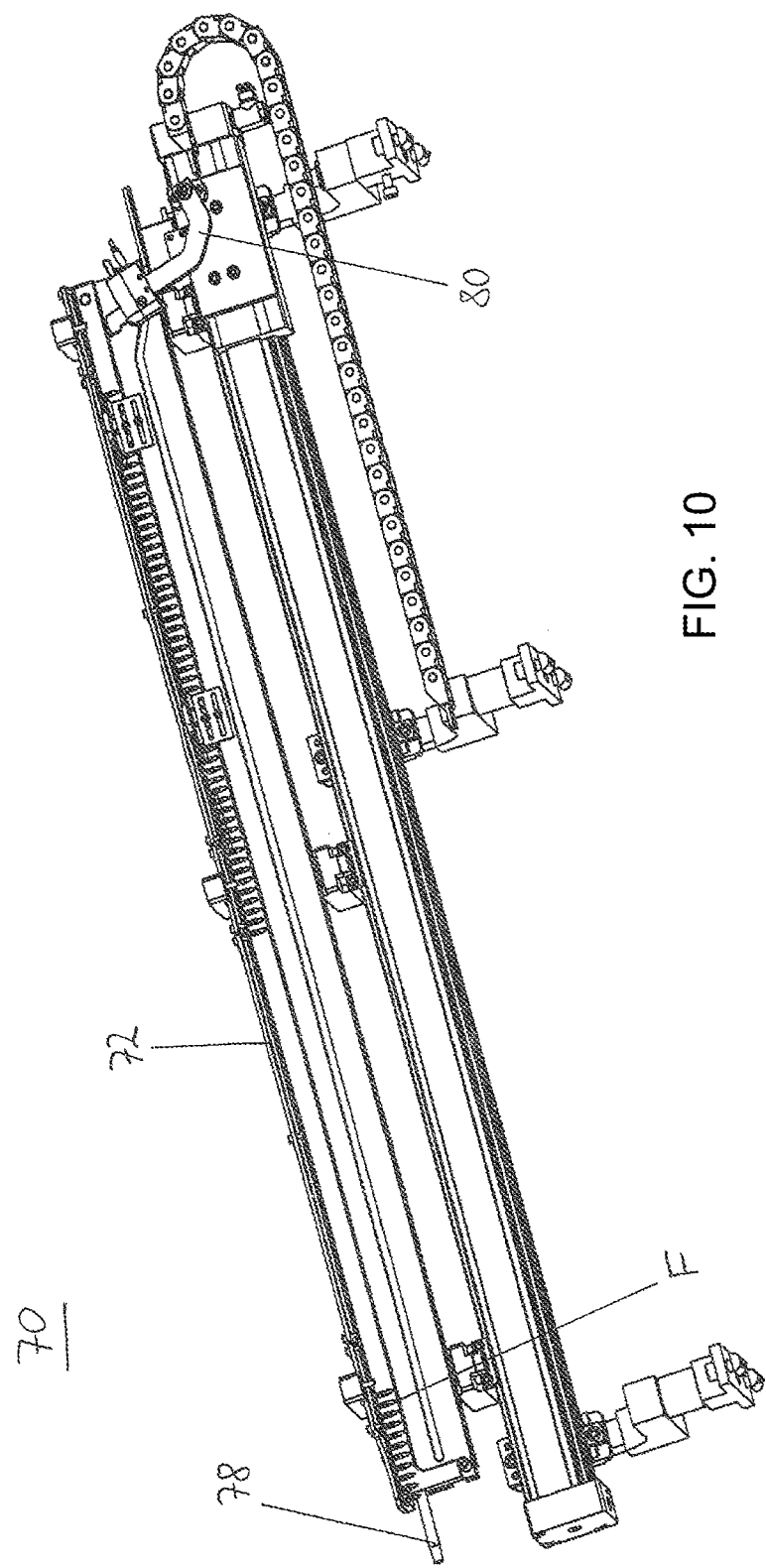
FIG. 10 is a side view of the pre-magazine of the provisioning module with a slider unit.

According to FIG. 8, the base body of the switching arrangement 60 is comprised of a glide plate have a plurality of transport tracks 66 in which the joining elements F are transported. The gliding of the joining elements F within the switching arrangement 60 results from the effect of gravity, because the switching arrangement 60 is disposed as an inclined plane. For further support of the gliding of the joining elements F, a vibration element 64 is preferably fastened to the switching arrangement 60. Specifically for the case, that the flow of joining elements F has been stopped or interrupted, the vibration element 64 facilitates a simple start-up of the joining elements within the transport tracks 66 of the switching arrangement 60.

The switching arrangement 60 comprises in addition, a track slide 62, which has at least on connecting track 63. The track slide 62 is moved by means of a pneumatic lift cylinder, while other drive alternatives can also be used in this context. Utilizing the sliding, or positioning of the track slide 62, a connection is produced by means of the at least one connecting track 63 between the vibration conveyor V and at least on transport track 66 and with it to a pre-magazine 70. Thus, the track slide 62 specifies which path the joining elements F take. It is preferred to equip the track slide 62 with connecting tracks 63 formed so that only one connection can be produced in each case between the vibration conveyor V and a pre-magazine 70. In this context, however, it is also conceivable to provide several connecting tracks 63 so that several pre-magazines 70 can be filled simultaneously.

The joining elements F, after passing through the switching arrangement 60, arrive at the pre-magazine 70. The pre-magazine 70 comprises a storage rail 72 for receiving and storing the joining elements F. The driving force for the movement of the joining elements F is gravity in this case too, because the storage rail 72 is disposed as an inclined plane. Thus, the joining elements F slide freely toward the end of the storage rail 72, facing away from the switching arrangement 60, where they accumulate due to a block 74. The shape of the cross section of the storage rail 72 corresponds to that of the storage groove 20, so that the joining elements F are held therein in the same manner.

Furthermore, the storage rail 72 preferably comprises light sensors or photoelectric barriers 76 which detect the fill level of the storage rail 72 with joining elements F. If a specific fill level limit is attained, this is signaled by the photoelectric barrier 76 to a control unit. This switches off the further feeding of joining elements F by the vibration conveyor V or by sliding the track slide 62. If the track slide 62 is slid, for example, a connection can thereby be produced between the vibration conveyor V and a further pre-magazine 70 to be filled.

After the storage rail 72 has been sufficiently filled with joining elements F, the magazine 1 of the setting device S couples to the storage rail 72. For this purpose, the storage rail 72 comprises a coupling unit 78 comprised of a pin and a sensor. By means of the pin 78, a mechanical occurs at the magazine 1 to its connection module 15, with which the storage rail 72 and the storage groove 20 are aligned to each other so that the joining elements F can be moved without resistance into the storage groove 20. For this purpose, the connection module 15 has a suitable opening for the pin of the coupling unit 78. No locking occurs as soon as the magazine 1 is coupled to the storage rail 72, rather the magazine 1 is held fixed in this position by means of the robot R. In addition, the sensor of the coupling unit 78 detects that a connection has been established between the magazine 1 and the storage rail 72. Based on this information of the sensor, the control unit starts the transfer of the joining elements F from the storage rail 72 into the storage groove 20 of the magazine 1.

The pre-magazine 70 comprises a slide unit 80, which can be moved along the storage rail 72, in order to transfer the joining elements F from the pre-magazine 70 and the storage rail 72 into the magazine 1 of the setting device S. For this purpose, the slide unit 80 is guided, motor driven, similar to a sled on a rail 82. The slide unit 80 comprises a pivot arm 88 that is guided in a curved track 84 at the storage rail 72.

Furthermore, a resilient stop 86 provided at this pivot arm 88 which, with appropriate positioning, engages with the joining elements stored in the storage rail 72, and slides these out of the storage rail 72 into the magazine 1.

Figure 11:
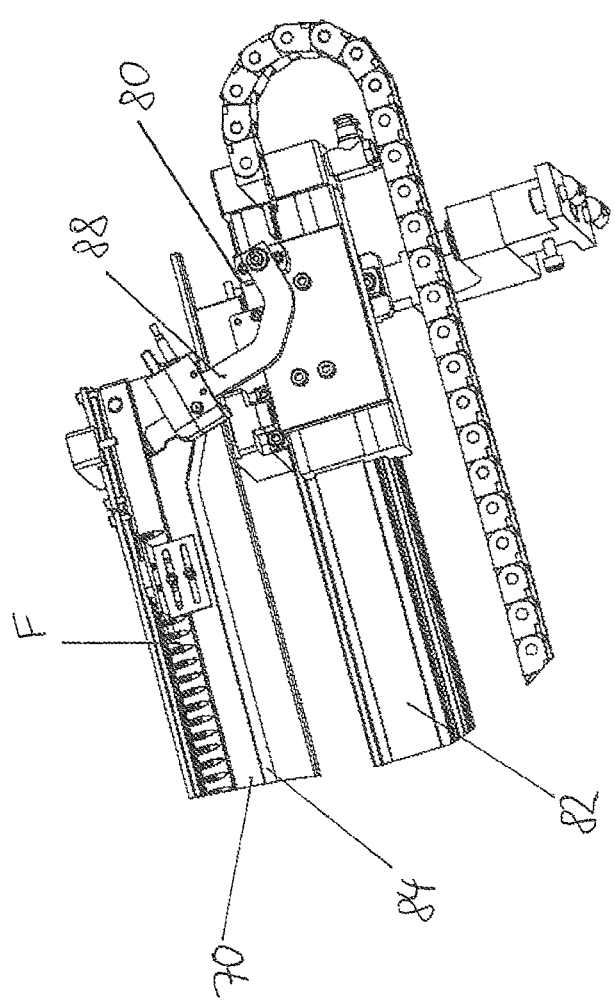
FIGS. 11 and 12 are enlarged representations of the slider unit respectively, of the pre-magazine.
Figure 12:
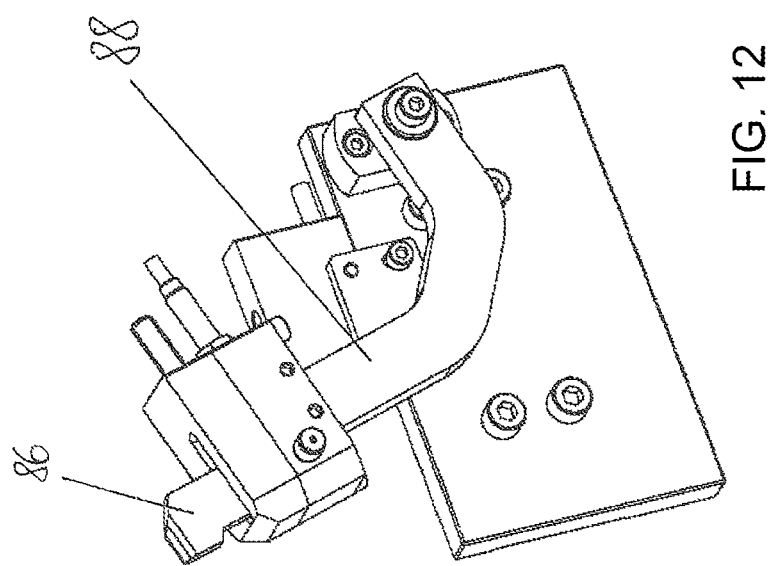

If the slide unit 80 travels along the rail 82 for sliding the joining elements F out of the storage rail 72—in FIG. 11, this movement of the slide unit 80 is toward the left—, the stop 86 is moved in the direction of the joining elements F, because the pivot arm 88 is guided in the curved track 84. This guiding is implemented by a roller, for example, which is fastened at the pivot arm 88 and engages in the curved track 84. If the slide unit 80 moves along the rail 82 away from the switching arrangement 60, the resilient stop 86 is moved so that it engages from below into the storage rail 72, and comes into contact with the shaft of the joining element F last stored there. Through further travel of the slide unit 80 along the rail 82, the joining elements F are slid out of the storage rail 72 into the magazine 1, because the block 74 at the lower end of the storage rail 72 exposes the path for the joining elements F, because the resilient blocking force of the block 74 is less than advancing force of the slide unit 80.

The slide unit 80 slides the joining elements F in front of it until the magazine 1 of the setting device S is completely full. The state of a completely filled magazine 1 is detected by a measurement system of the slide unit 80. For this purpose, the slide unit 80 comprises a first sensor, with which the movement of the slide unit 80 along the storage rail 72 can be determined. If this first sensor determines that the slide unit 80 no longer moves along the storage rail 72, this is a first indication that the magazine 1 could be completely filled. Such a sensor operates as a light sensor, for example, which ascertains that the slide unit 80 moves using a periodic interruption of the light signal detected by it. If this periodic interruption of the light signal no longer exists, the slide unit 80 is no longer moving along the storage rail 72.

In addition, the slide unit 80 comprises a second sensor with which the contact of the slide unit 80 with a plurality of accumulated joining elements F in the storage rail 72 can be detected. This is implemented by the resilient stop 86, which in the case of a backup of joining elements F in the storage rail 72 during the filling of the magazine 1, is deflected within an elongated slot against the pushing travel movement of the slide unit 80. This deflection movement of the resilient stop 86 can be detected by a sensor. Thus, if the control unit receives information from the first sensor that the slide unit 80 is no longer moving along the storage rail 72, and from the second sensor at the resilient stop 88, that the slide unit 80 has moved up against an accumulated quantity of joining elements F, the control unit activates a return travel of the slide unit 80 into its initial position. This initial position is near the switching arrangement 60 in which, due to the curved track 84, the resilient stop 86 and the pivot lever 88 are disposed again removed from the joining elements F within the storage groove 72. Due to this initial position of the slide unit 80, the resilient stop 86 exposes the storage rail 72 so the new joining elements F can enter into the storage rail 72.

Figure 13:
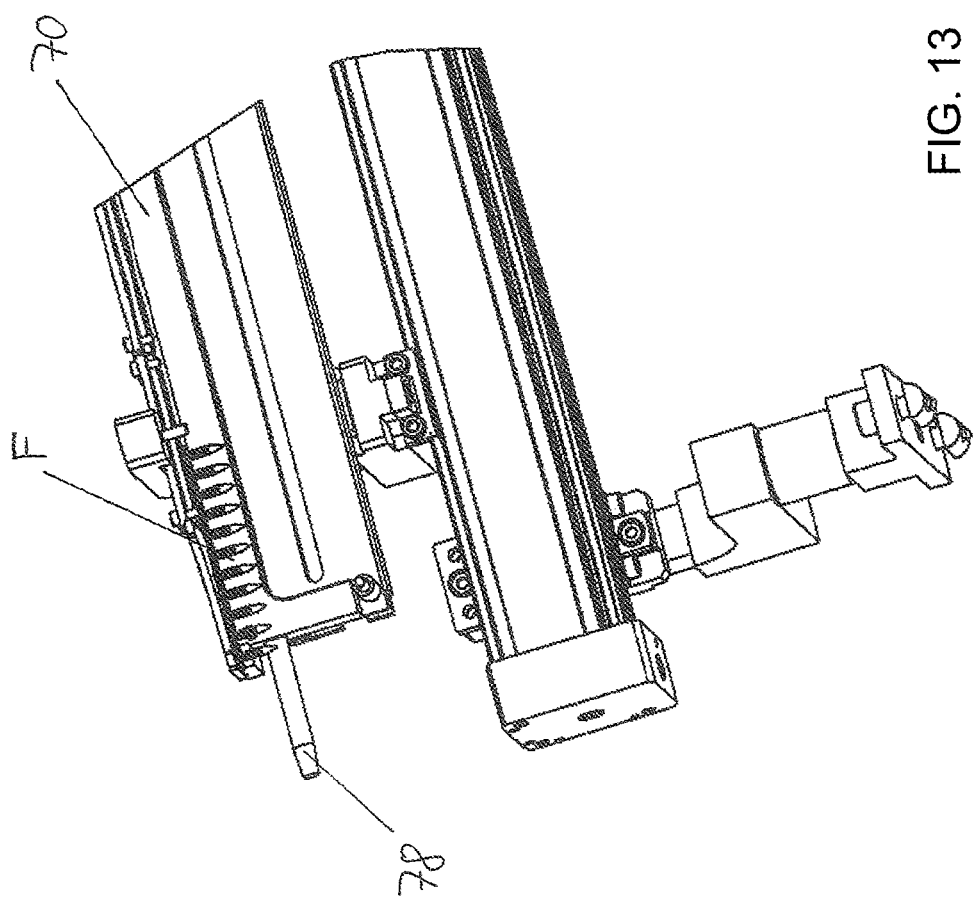
FIG. 13 is a coupling unit of the pre-magazine.
Figure 14:
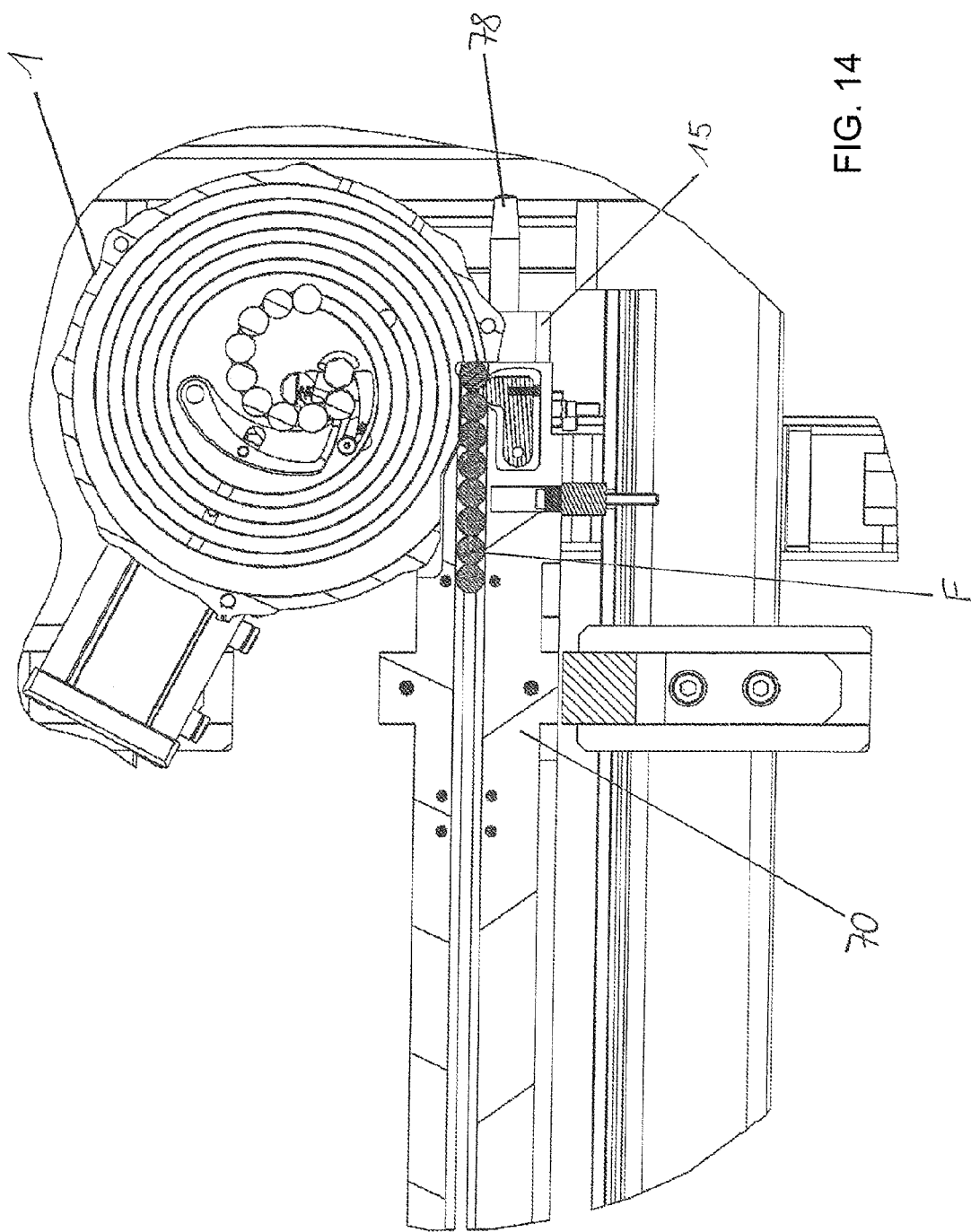
FIG. 14 illustrates the pre-magazine in connection to the magazine of the setting device in a sectional representation.
Figure 15:
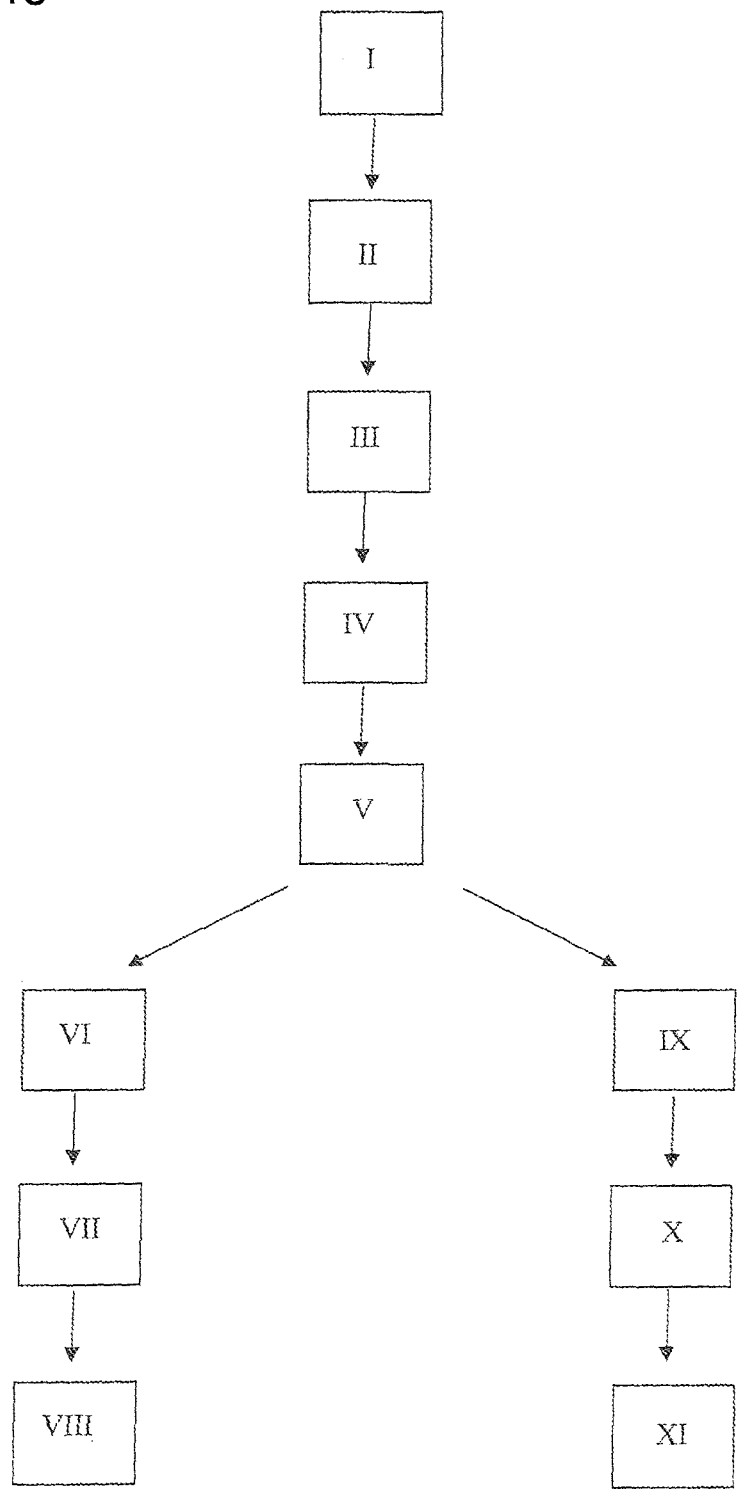
FIG. 15 is a flow diagram of the method for feeding joining elements to a magazine of a setting device.

Based on the description above, the steps of the feeding method for joining elements F toward the magazine 1 of the setting device S are summarized in the following. For further explanation, these steps are shown in a flow diagram in FIG. 13.

Initially in step I, a filling of the vibration conveyor V with joining elements F occurs. According to step II, the joining elements F are conveyed from the vibration conveyor V and aligned. In order to prepare the filling of the magazine 1 of the setting device S, initially at least one pre-magazine 70, preferably a plurality of pre-magazines 70, are provided within the provisioning module B. This procedure takes place in step III. These pre-magazines 70 are connected via the switching arrangement 60 to the vibration conveyor V, as was already described. In step IV, the first pre-magazine 70 is filled with joining elements F. For this purpose, the joining elements F provided by the vibration conveyor V are fed via the switching arrangement 60 to the first pre-magazine 70. In step V, the at least one sensor 76 at the pre-magazine 70 signals that a specific fill state of joining elements F in the pre-magazine 70 is attained. Based on this information, the control unit of the provisioning module B interrupts the further feeding of joining elements F. The interruption of the feeding of further joining elements F toward the pre-magazine 70 occurs according to two different alternatives. In step VI, the interruption of the feeding of joining elements F to the first pre-magazine 70 is implemented by switching off the vibration conveyor V. Alternatively to this, in step IX, the interruption of the further feeding of joining elements F to the first pre-magazine 70 is implemented by switching the switching arrangement 60 for transferring the joining elements F to a further pre-magazine 70. Subsequently, in the steps VIII and X, a coupling of the magazine 1 to the first pre-magazine 70 or to a further, already filled pre-magazine 70 takes place. As soon as this coupling is concluded and, has been signaled by appropriate sensor to the control unit, the control unit orders a transfer of the joining elements F from the pre-magazine 70 into the magazine 1 by means of the slide unit 80. This transfer takes place in step VIII and XI. Finally, the slide unit 80 returns again into its initial position near the switching arrangement 60 and thereby exposes, the pre-magazine 70 for a new filling with joining elements F.

The invention claimed is:

1. A magazine of a setting device for storing and feeding a plurality of joining elements, including setting fasteners, comprising:
    a) a base element within the setting device having a spiral storage groove, said storage groove extending from a peripheral edge of the base element to the center of said base element and in which said joining elements can be received aligned and jointly movable at a radial outer edge, and whose radial inner end opens into a head piece of the setting device;
    b) an advancing mechanism having an two-dimensional brush-like arrangement, comprising a rotating disk brush, with which the joining elements can be moved within the storage groove toward the head piece of the setting device by a frictional connection; and
    c) a dispensing mechanism, with which the joining elements can be fed individually out of the storage groove into the head piece of the setting device.

2. The magazine according to claim 1, wherein said storage groove is designed so that the joining elements are held therein by positive fit.

3. The magazine according to claim 1, wherein the two-dimensional brush-like arrangement is disposed on one side of the base element facing away from a setting channel.

4. The magazine according to claim 1, wherein the advancing mechanism has a plurality of air jets which are disposed within the storage groove, enabling the joining elements to be moved by blowing air into the storage groove.

5. The magazine according to claim 1, wherein the dispensing mechanism comprises a rotary slider that moves the joining elements individually from the storage groove into the head piece of the setting device.

6. The magazine according to claim 5, wherein the dispensing mechanism includes two spring preloaded jaws that close the head piece of the setting device, including a setting channel of the head piece, in a movable manner, and automatically expose the setting channel under pressure by a joining element.

7. The magazine according to claim 3, wherein the dispensing mechanism includes two spring preloaded jaws that close the head piece of the setting device, including the setting channel of the head piece, in a movable manner, and automatically expose the setting channel under pressure by a joining element.

8. The magazine according to claim 1, further having a connecting module at the outer edge of the base element at which a pre-magazine for joining elements can be fastened to the magazine, enabling joining elements to be transferred out of the pre-magazine into the storage groove.

9. The magazine according to claim 1, further comprising a sensor adjacent to the storage groove with which exceeding a minimum number of joining elements within the storage groove can be detected.

10. A setting device for the setting of joining elements, said device having a magazine according to claim 1.

11. The setting device according to claim 10, said device being fastened to a robot to enable the setting device to be moved toward a provisioning module.

12. A method for feeding joining elements to a magazine according to claim 1, of a setting device said method comprising the steps of:
    a) filling a pre-magazine of a provisioning module with a plurality of joining elements, said joining elements being moveable and arranged in an aligned manner;
    b) moving a setting device having the magazine to the pre-magazine and coupling the magazine to the pre-magazine; and
    c) sliding the joining elements out of the pre-magazine into the magazine of the setting device using a slider unit.

13. The magazine according to claim 1, wherein said two-dimensional brush-like arrangement is motor-driven.

* * * * *